(12) United States Patent
Shinbori et al.

(10) Patent No.: US 10,872,040 B2
(45) Date of Patent: *Dec. 22, 2020

(54) MAGNETIC DISK DEVICE AND RECORDING METHOD OF THE SAME

(71) Applicants: Kabushiki Kaisha Toshiba, Tokyo (JP); Toshiba Electronic Devices & Storage Corporation, Tokyo (JP)

(72) Inventors: Takahiro Shinbori, Yokohama Kanagawa (JP); Ryuta Kumagai, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/783,965

(22) Filed: Feb. 6, 2020

(65) Prior Publication Data

US 2020/0174941 A1 Jun. 4, 2020

Related U.S. Application Data

(62) Division of application No. 16/126,302, filed on Sep. 10, 2018, now Pat. No. 10,592,423.

(30) Foreign Application Priority Data

Mar. 19, 2018 (JP) .................... 2018-051536

(51) Int. Cl.
*G11B 20/12* (2006.01)
*G06F 12/10* (2016.01)

(52) U.S. Cl.
CPC .......... *G06F 12/10* (2013.01); *G11B 20/1217* (2013.01); *G06F 2212/1044* (2013.01);
(Continued)

(58) Field of Classification Search
CPC ............. G06F 12/10; G06F 2212/1044; G11B 20/1217; G11B 2020/1238;
(Continued)

(56) References Cited

U.S. PATENT DOCUMENTS 8,699,159 B1 4/2014 Malina
8,896,953 B2 11/2014 Haga et al.
(Continued)

FOREIGN PATENT DOCUMENTS

JP 2012-138154 A 7/2012
JP 2013-246838 A 12/2013
(Continued)

*Primary Examiner* — Nabil Z Hindi
(74) *Attorney, Agent, or Firm* — White & Case LLP

(57) ABSTRACT

According to one embodiment, a magnetic disk device includes heads and a controller. The heads write data in a recording region of the magnetic disk. The controller divides in order, by a track group with a constant size, an entire region of the recording region where management regions indicating physical positions corresponding to the heads, respectively, creates the track groups so as to straddle the management regions at boundaries of the management regions, and controls writing of the data for each of the track groups. The controller assigns unique and logically consecutive numbers to the track groups and manages information on the management regions to which the track groups belong.

13 Claims, 4 Drawing Sheets

(52) U.S. Cl.
CPC .................. *G11B 2020/1238* (2013.01); *G11B 2020/1292* (2013.01)

(58) Field of Classification Search
CPC .............. G11B 2020/1292; G11B 5/09; G11B 2020/1242; G11B 20/12; G11B 5/0275; G11B 15/005
USPC ...................................................... 360/48, 53
See application file for complete search history.

(56) References Cited

U.S. PATENT DOCUMENTS

| | | | |
|---|---|---|---|
| 8,988,817 B1 * | 3/2015 | Cherubini | G11B 5/584 360/77.12 |
| 9,087,551 B2 | 7/2015 | Kojima | |
| 9,286,926 B1 * | 3/2016 | Dhanda | G11B 5/59688 |
| 2012/0162809 A1 | 6/2012 | Iida | |

FOREIGN PATENT DOCUMENTS

| | | |
|---|---|---|
| JP | 2014-127029 A | 7/2014 |
| JP | 5781010 B2 | 9/2015 |

* cited by examiner

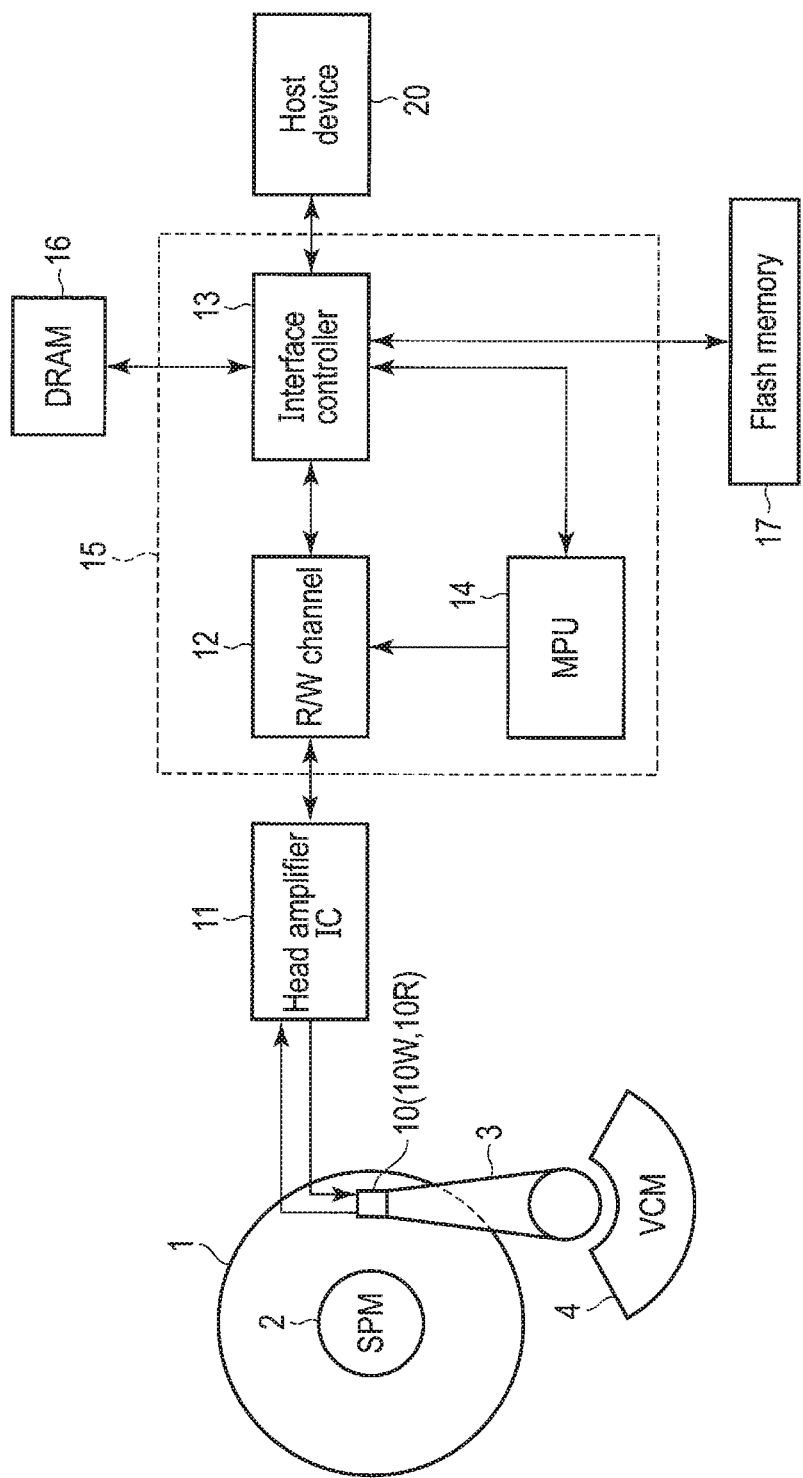
F I G. 1

Mark indicating that table includes band across ZONE/HEAD

| ... | a | a+1  * | a+2 | ... |
|---|---|---|---|---|
|  | zone n<br>head m | zone n, n+1<br>head m, m+1 | zone n+1<br>head m+1 |  |

Band 1    2    3    4
zone n

Change band size of entire region

Band 1  2  3  4  5  6  7
zone n

MAGNETIC DISK DEVICE AND RECORDING METHOD OF THE SAME

CROSS-REFERENCE TO RELATED APPLICATIONS

This application is a divisional of application Ser. No. 16/126,302 filed Sep. 10, 2018 and is based upon and claims the benefit of priority from Japanese Patent Application No. 2018-051536, filed Mar. 19, 2018, the entire contents of which are incorporated herein by reference.

FIELD

Embodiments described herein relate generally to a magnetic disk device and a recording method of the same.

BACKGROUND

In the case of applying a so-called shingled write (also referred to as shingled recording) method in a magnetic disk device (hereinafter referred to as hard disk drive (HDD)), the track group (hereinafter referred to as a band) is limited to be divided within the same ZONE/HEAD (hereinafter referred to as ZONE/HEAD) in order to keep the transfer rate constant in the same ZONE/HEAD. In addition, retry management at the occurrence of write/read error is also managed on the assumption that it is within the same ZONE/HEAD.

In the shingled recording system, there is a Zoned device ATA Command set (ZAC) standard to improve a point of weakness in random access and a point which is difficult to use. In the ZAC standard, the entire device is divided by a uniform number of sectors (capacity), and the size and boundary are presented on the host side. Although this makes it possible to use the device easily, the device is required to have an extra capacity.

In other words, as in the ZAC standard, when the device is created such that the band of the whole region is a fixed band of the same number of sectors (capacity) specified, a fractional track that does not satisfy the band size takes place near the ZONE boundary. Thus, in order to satisfy the required capacity, the ZONE boundary is moved toward the inner circumference by the necessary number of tracks to create a band, or the ZONE boundary is conversely moved toward the outer circumference to incorporate the fractional track into the next ZONE. In addition, if it is not desired to move the ZONE boundary, the fraction track is used as a spare sector (for a substitute when a defect occurs) which is not included in the user capacity.

When moving the ZONE boundary, it is necessary to extract defects of the region (because the Bits Per Inch (BPI) differs if the ZONE changes). Thus, there is a problem that the HDD manufacturing process is prolonged. Further, when the spare region is used, there is a problem that the device capacity is reduced.

An object of the embodiment of the present invention is to provide a magnetic disk device and a recording method which is capable of reducing waste of the capacity due to the zone boundary when performing the shingled recording system, eliminating the need to extract defects in the zone boundary, and shortening manufacturing process time.

BRIEF DESCRIPTION OF THE DRAWINGS

FIG. 1 is a block diagram schematically showing a magnetic disk device according to an embodiment;

DETAILED DESCRIPTION

Figures 2, 3:
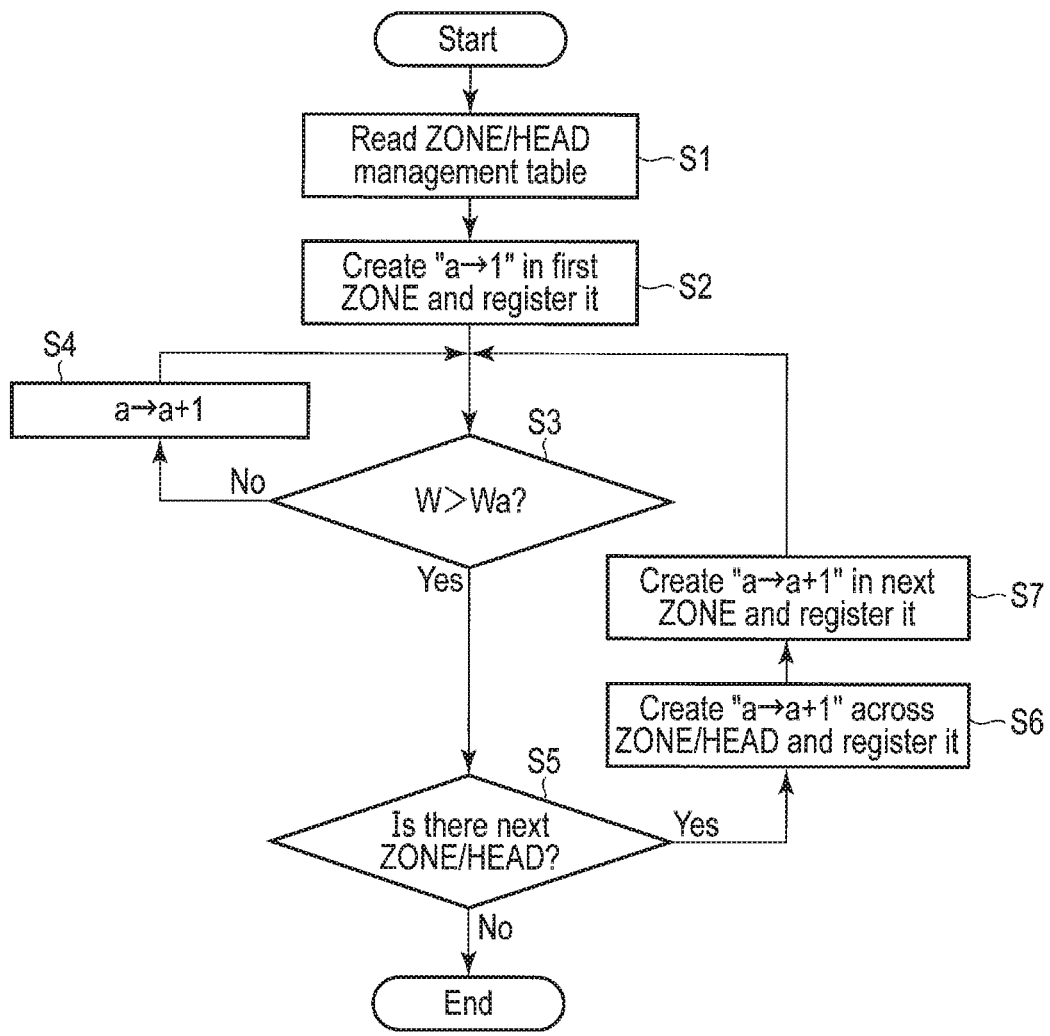
FIG. 2 is a flowchart showing a flow of a process of creating a band management table in the embodiment.
FIG. 3 is a diagram showing a specific example of the band management table in the embodiment.

Embodiments will be described hereinafter with reference to the accompanying drawings.

In general, according to one embodiment, in a magnetic disk device a magnetic disk device includes a plurality of heads and a controller. The heads write data in a recording region of a magnetic disk using a shingled magnetic recording method. The controller divides in order, by a track group with a constant size, an entire region of a recording region of the magnetic disk where a plurality of management regions indicating physical positions corresponding to the heads, respectively, are created in advance, creates the track groups so as to straddle the management regions at boundaries of the management regions, respectively, and controls writing of the data for each of the track groups. The controller assigns unique and logically consecutive numbers to the track groups, respectively, and manages information on the management regions to which the track groups belong, respectively.

In the following description, the disclosure is merely an example, and what those skilled in the art may appropriately modify with the gist of the invention and easily come up with naturally falls within the scope of the present invention. Further, in order to make the explanation clearer, the drawings may be schematically represented in terms of the width, thickness, shape, and the like of each part as compared with the actual mode, but it is only an example, and the interpretation of the present invention is not limited. Further, in this specification and each figure, the same reference numerals are given to the same elements as those described above with reference to the preceding figures, and the detailed explanation may be omitted as occasion demands.

Embodiment

FIG. 1 is a block diagram schematically showing a magnetic disk device (HDD) according to an embodiment. The HDD shown in FIG. 1 roughly includes a head-disk assembly (HDA) part, a head amplifier integrated circuit (hereinafter referred to as a head amplifier IC) 11, and a hard-disk controller (HDC) 15.

The HDD has a disk 1 as a recording medium, a spindle motor (SPM) 2, an arm 3 on which a head 10 is mounted, and a voice coil motor (VCM) 4. The disk 1 is rotated by a spindle motor 2. The arm 3 and the VCM 4 constitute an actuator. The actuator controls the movement of the head 10 mounted on the arm 3 to a designated position on the disk 1 by driving the VCM 4.

The head 10 has a slider as a main body, and has a write head 10W and a read head 10R mounted on the slider. The read head 10R reads data recorded on a data track on the disk 1. A write head 10W writes data on the disk 1.

A head amplifier IC11 has a read amplifier and a write driver. The read amplifier amplifies the read signal read by the read head 10R and transmits it to a read/write (R/W)

channel 12. On the other hand, the write driver transmits write current corresponding to the write data output from the R/W channel 12 to the write head 10W.

The HDC 15 includes an integrated circuit of one chip including the R/W channel 12, an interface controller 13, and a microprocessor (MPU) 14. The R/W channel 12 includes a read channel for performing signal processing of read data, and a write channel for executing signal processing of write data.

The interface controller 13 controls data transfer between a host device (hereinafter may be simply referred to as a host) 20 and the R/W channel 12. The interface controller 13 controls a buffer memory (DRAM) 16 to temporarily store the read data and the write data in the buffer memory 16, thereby performing the data transfer control. Further, the interface controller 13 controls a flash memory 17 to store and read various kinds of control information in the flash memory 17.

The MPU 14 is a main controller of the drive, and executes servo control for positioning the head 10 by controlling the VCM 4. Further, the MPU 14 has a management table of ZONE/HEAD CYLINDER in a shingled recording system and a band management table for managing band/in-band tracks, and creates bands using an address conversion unit.

With reference to FIGS. 2 to 5, the band creating method of the present embodiment will be described in the above configuration.

The HDD magnetic disk is partitioned by a region called ZONE, Tracks Per Inch (TPI) and Bits Per Inch (BPI) are different in each ZONE/HEAD. This is due to the difference in the outer diameter of the disk, and the number of sectors per track decreases toward the inner circumference from the outer circumference. For this reason, the transfer rate also decreases towards the inner circumference. In addition, there is a difference in performance between disks (media) and heads for each product, and it is necessary to optimize TPI and BPI for each ZONE/HEAD in order to secure necessary capacity and improve reliability. In the shingled recording system HDD, the recording region is divided into smaller regions called bands in the ZONE/HEAD for use. Generally, within the same ZONE/HEAD, the same band size (capacity) is used, and a guard track is provided between a band and a band so as not to adversely affect each other's data.

Conventionally, in order to keep the transfer rate constant within the same ZONE/HEAD, band division is also performed within the same ZONE/HEAD. In addition, retry management at the time of occurrence of write/read error is assumed to be within the same ZONE/HEAD. However, in a case where the band size is fixed (capacity fixed) as in the shingled recording system HDD to which the ZAC standard is applied, when trying to create a fixed capacity band within the same ZONE/HEAD, the number of tracks not included in the user capacity increases as compared with the conventional method in which the track is divided flexibly so that the tracks not included in the user capacity are minimized. Moreover, in the conventional management method such as retrying, since management is performed on the assumption that the ZONE/HEAD is the same in the band, it is impossible to create a band across HEAD/ZONE.

From the viewpoint of capacity and reliability, it is better to shift the ZONE boundary according to the band for each product without fixing it at the default location. However, when shifting the ZONE boundary, since the defect information that has been extracted at the initial TPI/BPI cannot be used, it is necessary to extract again the defect at the shifted track. It is necessary to repeat this extraction at all ZONE boundaries until reaching required capacity. In recent HDD trends, the number of heads tends to increase, and the number of ZONE boundaries is correspondingly increased. In addition, the number of cylinders also tends to increase, and when the number of cylinders in ZONE is made constant, the number of ZONE boundaries also increases as the number of heads increases. Therefore, it takes time to extract defect information corresponding to the number of the ZONE, and unnecessary tracks are increased in the HDD of the shingled recording system to which the ZAC standard is applied.

As described above, the current problems are that it is impossible to create a band across HEAD/ZONE, the fractional region that is created when dividing into band size is not included in the device capacity, or extra time is required for manufacturing. This embodiment solves these problems.

In the HDD performing the shingled recording system, in a case where HDD is created so that the band of the entire region becomes a fixed band having the same number of sectors as in the ZAC method, ZONE is divided into a certain size called a band at the time of manufacture, and is used in that unit. Creation of the band management table is performed according to the flowchart shown in FIG. 2. First, management information of the ZONE/HEAD numbered in order is read (step S1), a region of the band a→1 having the predetermined width Wa is created at the top of the region of the first ZONE (zone n=1/head m=1) and registered in the band management table (step S2), the remaining region width W of ZONE/HEAD is compared with the bandwidth Wa (step S3), when Wa falls within the W region, a region of band a→a+1 is created in the continuation in the first ZONE/HEAD region and registered in the band management table (step S4), and the processing in steps S3 and S4 is repeated until the remaining region width W of ZONE/HEAD becomes less than the bandwidth Wa. When the remaining region width W of ZONE/HEAD becomes less than the bandwidth Wa, it is determined whether there is the next ZONE/HEAD (step S5), when there is the next ZONE/HEAD, a region of the band a→a+1 is registered over the ZONE/HEAD in the creation band management table (step S6), a region of the band a→a+1 is created in the continuation of the straddling band in the region of the next ZONE (or ZONE of the next HEAD) and registered in the band management table (step S7), and the processing of steps S3 and S4 is repeated until W>Wa is satisfied. If there is no next ZONE/HEAD region in step S5, the series of processing is terminated.

A specific example of the band management table is shown in FIG. 3. In this example, management by ZONE/HEAD/CYLINDER is transferred to management by band/in-band track. This makes it possible to create a band across HEAD/ZONE. In FIG. 3, first, ZONE/HEAD is given a number indicating the order beforehand so that the next ZONE/HEAD can be known. Next, unique numbers a, a+1, a+2, . . . to the band (logically consecutive band arrangement) are allocated, and information of ZONE/HEAD, a=(zone n/head m), a+1=(zone n, n+1/head m, m+1), a+2=(zone n+1/head m+1), . . . to which the band belongs for each band a, a+1, a+2, . . . is added.

Here, in step S6, a mark * indicating that the band management table includes a special band as a band across ZONE/HEAD is added to the band management table. The address conversion unit recognizes this mark and calculates whether it is accommodated in the first half ZONE/HEAD or not. A process is added so that the first half ZONE/HEAD (n, m) is pointed when accommodated, and the next ZONE/HEAD (n+1, m+1) is pointed when not accommodated, and a mechanism is established so as to be converted to a correct physical position (ZONE/HEAD/CYLINDER). Thus, in a process other than that of the address conversion unit, it is not necessary to consider the physical position of the band.

In a process other than that of the address conversion unit, management of the band (including retry) is changed so that all are managed in the band/in-band track instead of the conventional management of the ZONE/HEAD/CYLINDER. This makes it possible to create a band across ZONE/HEAD.

Figure 4:
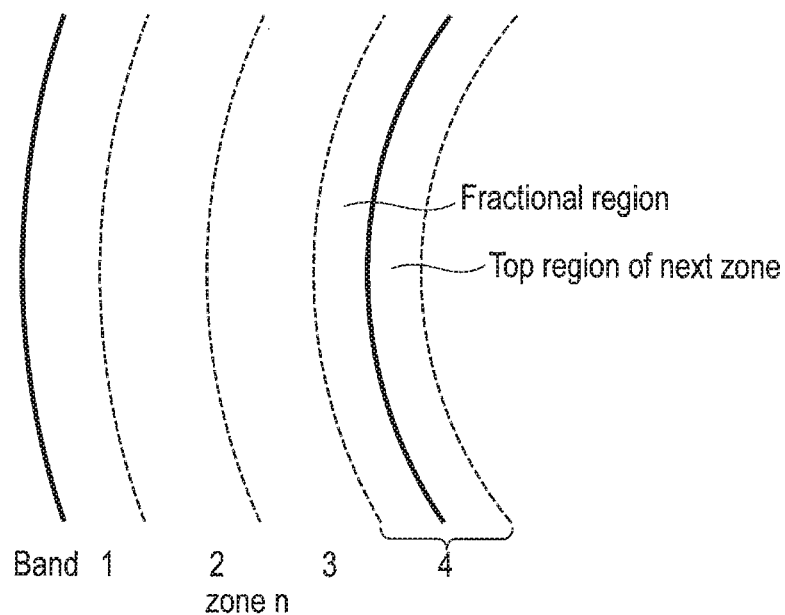
FIG. 4 is a conceptual diagram showing a processing content of a first example in the embodiment.

FIG. 4 shows the first example. In the present example, at ZONE=zone n, the zone n is divided with the band size from the top (bands 1 to 3). When dividing up to the end of ZONE, a fractional region the size of which is less than the band size is created at the end. The fractional region and the top region of the next ZONE are collectively treated as one band (band 4). Thus, the fractional region can be effectively utilized and included in the apparatus capacity. Furthermore, since there is no need to shift the boundary so as to match ZONE to the band size, it is unnecessary to extract defects and it is possible to shorten the manufacturing time.

Figure 5:
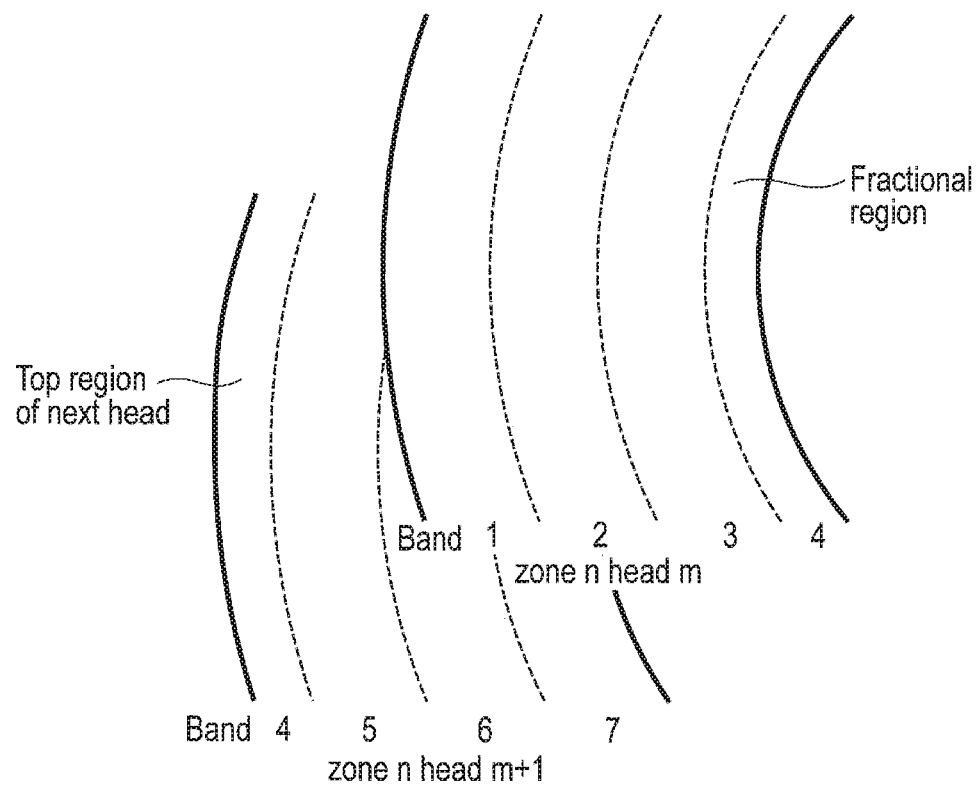
FIG. 5 is a conceptual diagram showing a processing content of a second example in the embodiment.

FIG. 5 shows a second example. In the present example, at ZONE=zone n, the zone n is divided with the band size from the top (bands 1 to 3). When dividing up to the end of ZONE, a fractional region the size of which is less than the band size is created at the end. This fractional region and the top region of the next HEAD are collectively handled as one band (band 4). Thus, the fractional region can be effectively utilized and included in the apparatus capacity. Furthermore, since there is no need to shift the boundary so as to match ZONE to the band size, it is unnecessary to extract defects and it is possible to shorten the manufacturing time.

Figure 6:
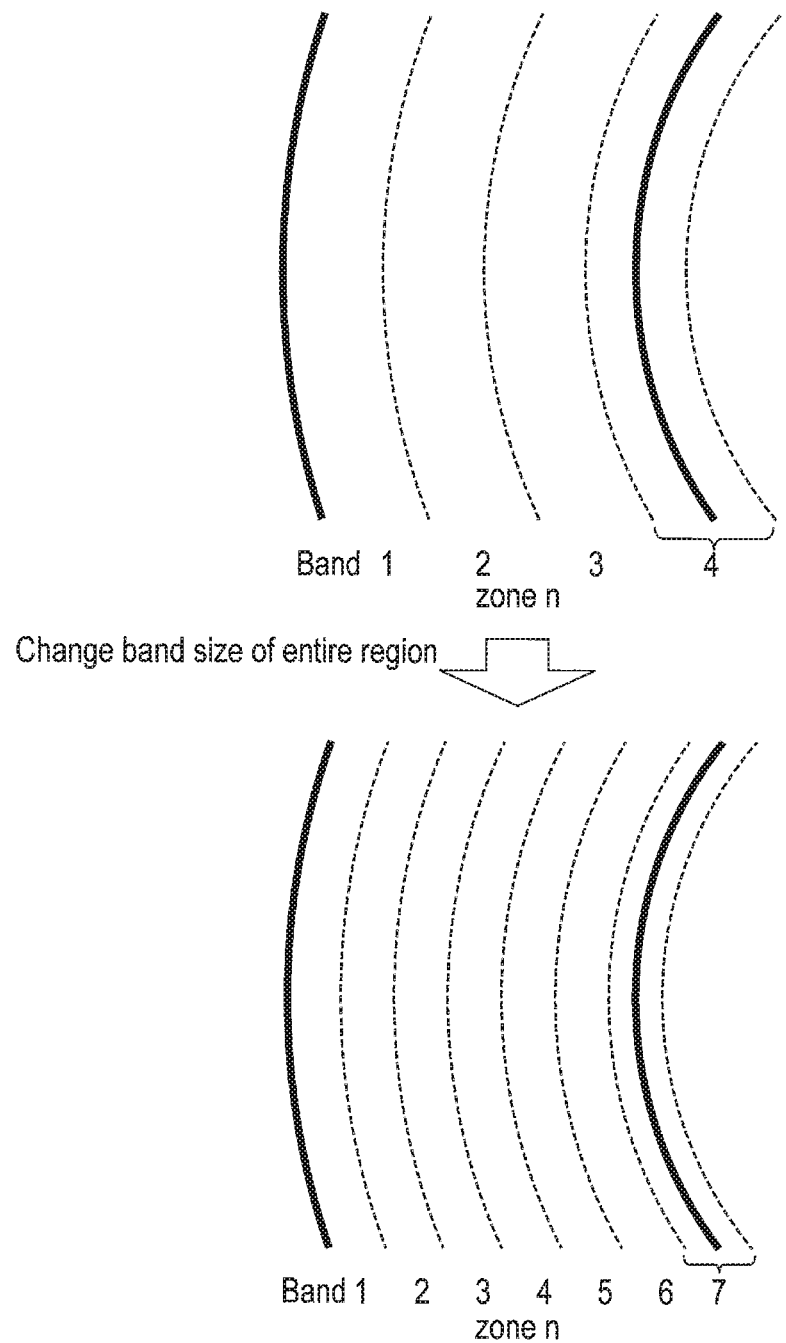
FIG. 6 is a conceptual diagram showing a processing content of a third example in the embodiment.

FIG. 6 shows a third example. In this example, a special command for changing the band size to any size is prepared beforehand. In this command, a ZONE can be re-partitioned with the specified band size from the top of the device. At this time, one band can be created logically by collecting one fractional region at the end of ZONE and the top region at the next ZONE. Then, when this command is used for the final stage of manufacturing at which the extraction of the defects has been completed or for the device whose manufacturing is completed, the band can be changed to have any band size later. At this time, since ZONE boundaries are not shifted, it is not necessary to perform a manufacturing process such as extraction of the defects, and there is no need to generate a useless fractional track less than the band size near the ZONE boundary. Also in the user environment, users can change the band to have any band size.

As described above, in the HDD according to the present embodiment, since the fractional track and the top track of the next ZONE or HEAD are collectively set as one band, the waste of the capacity can be reduced. In addition, it is unnecessary to move the boundary of ZONE, so that it is not necessary to extract the defect at the boundary of ZONE, and it is possible to solve the problem that the manufacturing process time is prolonged. Further, by using a special command prepared in advance as a mechanism for creating a band of a specified capacity in ZONE, even when changing the band size after the completion of the manufacturing process, it is possible to change the band size without performing the manufacturing process again.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a head which writes data in a recording region of a magnetic disk using a shingled magnetic recording method; and
a controller which divides in order, by a track group with a size, an entire region of a recording region of the magnetic disk where a plurality of management regions indicating physical positions corresponding to the head, respectively, are created in advance, creates the track groups so as to straddle the management regions in a radial direction of the magnetic disk at boundaries of the management regions, respectively, and controls writing of the data for each of the track groups.

2. The magnetic disk device of claim 1, wherein
the controller in advance assigns a number indicating an order to the management regions, adds an identification code to each of the track groups belonging to the management regions, and converts each of the management regions into a correct physical position by recognizing the identification code at a time of address conversion.

3. The magnetic disk device of claim 1, wherein
the controller manages a region a size of which is less than a size of the track group at an end of a management region and a region a size of which is a size of the remaining track group at a top of a next management region as one track group.

4. The magnetic disk device of claim 1, wherein
wherein the controller assigns logically consecutive numbers to the track groups, respectively, and manages information on the management regions to which the track groups belong, respectively.

5. The magnetic disk device of claim 1, wherein
the controller includes a resizing processor that executes a process of changing a size of the track group into any size.

6. The magnetic disk device of claim 5, wherein
the resizing processor executes the size changing process according to a request from a user.

7. A magnetic disk device comprising:
a plurality of heads which writes data in a recording region of a magnetic disk using a shingled magnetic recording method; and
a controller which divides in order, by a track group with a size, an entire region of a recording region of the magnetic disk where a plurality of management regions indicating physical positions corresponding to the heads, respectively, are created in advance, creates the track groups so as to straddle the management regions in a radial direction of the magnetic disk at boundaries of the management regions, respectively, and controls writing of the data for each of the track groups.

8. The magnetic disk device of claim 7, wherein
the controller in advance assigns a number indicating an order to the management regions, adds an identification code to each of the track groups belonging to the management regions, and converts each of the management regions into a correct physical position by recognizing the identification code at a time of address conversion.

9. The magnetic disk device of claim 7, wherein
the controller manages a region a size of which is less than a size of the track group at an end of a management region and a region a size of which is a size of the remaining track group at a top of a next management region as one track group.

10. The magnetic disk device of claim 7, wherein
the controller manages a region a size of which is less than a size of a track group at an end of a management region corresponding to a head and a region a size of which is a size of the remaining track group at a top of a management region corresponding to a next head as one track group.

11. The magnetic disk device of claim 7, wherein
wherein the controller assigns logically consecutive numbers to the track groups, respectively, and manages information on the management regions to which the track groups belong, respectively.

12. The magnetic disk device of claim 7, wherein
the controller includes a resizing processor that executes a process of changing a size of the track group into any size.

13. The magnetic disk device of claim 12, wherein
the resizing processor executes the size changing process according to a request from a user.

* * * * *